US006339419B1

(12) United States Patent
Jolly et al.

(10) Patent No.: US 6,339,419 B1
(45) Date of Patent: *Jan. 15, 2002

(54) MAGNETICALLY-CONTROLLABLE, SEMI-ACTIVE HAPTIC INTERFACE SYSTEM AND APPARATUS

(75) Inventors: Mark R. Jolly, Holly Springs; J. David Carlson, Cary, both of NC (US)

(73) Assignee: Lord Corporation, Cary, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 37 days.

(21) Appl. No.: 09/189,487

(22) Filed: Nov. 10, 1998

(51) Int. Cl.[7] ................................. G09G 5/00
(52) U.S. Cl. ..................... 345/156; 434/45; 244/223
(58) Field of Search ........................ 345/156, 161, 345/163, 168; 463/37, 38, 30; 434/45; 244/223

(56) References Cited

U.S. PATENT DOCUMENTS

| 4,351,515 | A | | 9/1982 | Yoshida ................... 267/8 R |
|---|---|---|---|---|
| 5,513,100 | A | * | 4/1996 | Parker et al. ........... 364/167.01 |
| 5,629,594 | A | | 5/1997 | Jacobus et al. ......... 318/568.11 |
| 5,691,898 | A | * | 11/1997 | Rosenberg et al. ......... 364/190 |
| 5,721,566 | A | * | 2/1998 | Rosenberg et al. ......... 345/161 |
| 5,734,373 | A | * | 3/1998 | Rosenberg et al. ......... 345/161 |
| 5,805,140 | A | * | 9/1998 | Rosenberg et al. ......... 345/161 |
| 5,999,168 | A | * | 12/1999 | Rosenberg et al. ......... 345/161 |
| 6,002,184 | A | * | 12/1999 | Delson et al. ................ 310/14 |
| 6,088,019 | A | * | 7/2000 | Rosenberg ................ 345/156 |
| 6,100,687 | A | * | 8/2000 | Weitekamp et al. ........ 324/300 |
| 6,100,874 | A | * | 8/2000 | Schena et al. .............. 345/157 |
| 6,147,674 | A | * | 11/2000 | Rosenberg et al. ......... 345/157 |

FOREIGN PATENT DOCUMENTS

| EP | 0 775 961 A1 | 5/1997 |
|---|---|---|
| EP | 0 776 813 A1 | 6/1997 |
| WO | WO 97/19440 | 5/1997 |
| WO | WO 97/44775 | 11/1997 |
| WO | WO 98/24183 | 6/1998 |

OTHER PUBLICATIONS

Russo and Tadros; Controlling Dissipative Magnetic Particle Brakes In Force Reflective Devices, Advances in Robotics, vol. 42 ASME 1992, pp. 63–70.

(List continued on next page.)

Primary Examiner—Bipin Shalwala
Assistant Examiner—Richardo Osorio
(74) Attorney, Agent, or Firm—Michael M. Gnibus (57) ABSTRACT

A haptic interface system or force feedback system having a magnetically-controllable device that provides resistance forces opposing movement. The magnetically-controllable device is adapted for use with a force feedback computer system to provide force feedback sensations to the system's operator. The magnetically-controllable device contains a magnetically-controllable medium beneficially providing variable resistance forces in proportion to the strength of an applied magnetic field. The system further comprises a computer system that runs an interactive program or event, a video display display, and a haptic interface device (e.g. joystick, steering wheel) in operable contact with an operator for controlling inputs and responses to the interactive program. Based on the received inputs and on processing the interactive program, the computer system provides a variable output signal, corresponding to a feedback force, to control the magnetically-controllable device for providing dissipative resistance forces to oppose the movement of the haptic interface device and to provide the operator with a force feedback sensation.

30 Claims, 8 Drawing Sheets

OTHER PUBLICATIONS

Furusho and Sakaguchi, New Actuators Using ER Fluid And Their Applications To Force Display Devices in Virtual Reality And Medical Treatments, ERMR, 1997, pp 1–9.

Furusho, Takesue, Zhang and Sakaguchi, Motion Control Of Robot Arms With Variable Damper Using Liquid Crystalline Polymers, ERMR 1997.

"Clinical potential and design of programmable mechanical impedances for orthotic applications". William S. Harwin, Lee O. Leiber, Gregory P.G. Austwick, and Chryssa Dislis. *Robotica* (1988) vol. 16, pp. 513–530.

* cited by examiner

MAGNETICALLY-CONTROLLABLE, SEMI-ACTIVE HAPTIC INTERFACE SYSTEM AND APPARATUS

FIELD OF THE INVENTION

The present invention relates generally to a haptic interface system for providing force feedback sensations, and more particularly, to a haptic interface system employing a magnetically-controllable medium to provide resistance forces.

BACKGROUND

Haptic interface systems, also known as force feedback systems, provide an operator holding an interface device, such as a joystick, with "feel" sensations corresponding to whatever is being controlled by the interface device. A common example of such a system is in computer games. In such games, the action on a video display and the movement of a joystick or steering device are coordinated with physical force imparted to the operator's hand through the joystick or steering device, to provide a simulated "feel" for events happening on the display. For example, in an auto racing game, when an operator steers a car around a sharp turn at high speed, the haptic interface system imparts force on the steering wheel to make it more difficult to turn the wheel into the curve. This force feedback simulates the centrifugal force of the car making the turn and the friction forces applied to the tires as they are turned. Thus, haptic interface systems provide remote simulation of the actual physical feeling associated with an action or event through force feedback.

Typical haptic interface systems include one or more motors connected to the interface device in order to impart the force feedback sensation. Typical motors include direct current (DC) stepper motors and servo-motors. If the interface device is a joystick, motors are used to impart force in an x-direction, in a y-direction, or in combination to provide force in any direction that the joystick may be moved. Similarly, if the interface device is a steering wheel, motors are used to impart rotational force in a clockwise or counterclockwise direction. Thus, motors are used to impart forces in any direction that the interface device may be moved.

In a system using a single motor, the motor may be connected to the interface device through a gear train, or other similar energy transfer device, in order to provide force in more than one direction. In order to enable one motor to be used in a system, a reversible motor is typically utilized to provide force in two different directions. Additionally, mechanisms are required to engage and disengage the various gears or energy transfer devices to provide force in the proper direction at the proper time. In contrast, other typical systems use more than one motor to provide force in the required directions. Thus, current systems utilize a number of differing approaches to handle the delivery of force feedback sensations.

Current haptic interface systems may be disadvantageous, however, for a number of reasons. One primary area of concern is the cost of such systems. One item greatly contributing to the cost of a typical system is the use of DC stepper and servo-motors, and reversible motors. These types of motors are very sophisticated, requiring the ability to change speeds or rotations per minute (rpm), maintain different speeds, and reverse rotational direction. These features require greater mechanical and electrical complexity, which equates to a comparatively very high cost. Further, these motors need to be small in size in order to keep the haptic interface system from becoming unwieldy. This additionally complicates their design and increases cost. Also, because of their relatively small size, the sophisticated motors typically required in a haptic interface system are only able to generate a limited amount of torque. As such, the operator of an interface device may easily be able to overcome the torque or force feedback supplied by the motor. Thus, providing a small, sophisticated motor for a haptic interface system is relatively very costly, and may result in insufficient force feedback.

Also disadvantageously, typical DC motors used in haptic interface systems are not designed to perform in the manner required by the system. In order to provide force feedback, typical systems use direct drive motors configured to mechanically engage the output shaft of the motor with the interface device. For example, the output shaft of a DC motor may be geared to a steering wheel shaft or linked to a slide or other mechanism controlling the movement of a joystick. When the motor engages the gear or slide, the motor drives the interface device to provide force feedback. The operator holding the interface device, however, typically opposes the force feedback. The opposing force supplied by the operator then works against the direction of the motor output, which tends to stall the motor. Not only does this opposing force tend to wear out and/or strip components within the motor, but the stall condition leads to the generation of higher electric currents within the motor, straining the electrical components in the motor. Due to the repetitious nature of a haptic interface system, the reliability and longevity of motors in such haptic interface systems are severely reduced. Thus, motors used in typical haptic interface systems are typically not very well suited for the demanding environment in which they are operated.

Yet another disadvantage of current commercial haptic interface systems is that high impact forces from a motor connected to an interface device may be dangerous for the operator of the interface device. When the haptic interface system requires a quick, high impact force, a motor connected to an interface device may respond with a large force that may injure the operator if the operator is not ready for the abrupt force. This may be accounted for by ramping up the speed of the motor to achieve the force, but then the sensation becomes less realistic. Further, varying the engagement speeds of the motor complicates the software program that is used to run the haptic interface system, thereby further increasing cost. Thus, producing a realistic-feeling high impact force with current haptic interface systems may be dangerous to the operator or may require costly and complex system programming.

Some prior art devices have attempted to overcome some of the drawbacks of current haptic interface systems, with limited results. An electrorheological (ER) actuator, utilized in a force display system, is proposed by J. Furusho and M. Sakaguchi entitled "New Actuators Using ER Fluid And Their Applications To Force Display Devices In Virtual Reality Systems," in abstracts of the International Conference On ER Fluids, MR Suspensions and their Applications, Jul. 22–25, 1997 Yonezawa, Japan, pg. 51–52. An ER actuator comprises a device that contains an ER fluid, which is a substance that changes its shear strength with application of an electric field. The ER fluid can then be used as a clutch or a brake to increase resistance between two members.

The use of such an ER actuator is severely disadvantageous, however, for use in typical haptic interface systems, such as for computer games. One major issue is that an ER actuator presents a major safety problem because of the high electric voltage required to produce the electric field necessary to generate a desired change in shear strength in the ER fluid. For a haptic interface system, a typical ER fluid actuator may require voltages in the range of about 1000 to 5000 volts. Conversely, the motors used in the typical systems described above require in the range of about 500 milliamps (mA) to 1.0 A of current. Thus, the voltage required to operate an ER actuator is very high, making an ER actuator undesirable, and possibly unsafe, for a consumer device subject to a great amount of wear and tear.

Additionally, an ER actuator detrimentally requires expensive seals to hold the ER fluid within cavities within the actuator. Seals frequently wear, causing reliability problems for ER actuators and concerns about ER fluid leaks. Further, the use of seals typically requires machined parts having tight tolerances, additionally increasing the cost of the ER actuator. Also, ER actuators require expensive bearings to insure the relative positioning of the tight-tolerance parts.

Similarly, precise machining is required for the internal rotating components of an ER actuator, further increasing the cost of the actuator. Because an ER device requires a relatively large amount of surface area between the ER fluid and the two members that the ER fluid contacts, tight tolerance machining is needed between the multiple, adjacent surfaces of the members. Thus, a relatively large amount of surface area may be required to generate sufficient torque to provide the levels of force feedback required by typical haptic interface systems.

Finally, typical ER actuators that provide appropriate force may be too large to be integrated into a commercial haptic interface system. The device utilized to provide force feedback in a typical haptic interface system must be small and lightweight in order to be practically integrated into the system. An ER actuator meeting these requirements is very costly to produce, besides having the above-stated deficiencies. Thus, utilization of an ER actuator in a typical haptic interface system is not desirable.

Therefore, it is desirable to provide a haptic interface system that is more simple, cost-effective, reliable and better performing than the above-stated prior art.

SUMMARY OF THE INVENTION

According to a preferred embodiment of the present invention, a haptic interface system comprises a magnetically-controllable device that advantageously provides a variable resistance force that opposes movement of a haptic interface device to provide force feedback sensations. The haptic interface device is in operative contact with the operator who controls and responds to the interactive program. The magnetically-controllable device beneficially comprises a magnetically-controllable medium between a first and second member, where the second member is in communication with the haptic interface device. The magnetically-controllable medium provides the variable resistance force, in proportion to the strength of an applied magnetic field, that opposes relative movement between the first and second members. The system further comprises a computer system adapted to run an interactive program, a video display for displaying images associated with the interactive program and a sensor that detects the position of the haptic interface device and provides a corresponding variable input signal to the computer system.

The computer system processes the interactive program, and the variable input signal from the sensor, and provides a variable output signal corresponding to a semi-active, variable resistance force that provides the operator with realistic sensations corresponding to the interactive program. The variable output signal energizes a magnetic field generating device, disposed adjacent to the first and second members, to produce a magnetic field having a strength proportional to the variable resistance force. The magnetic field is applied across the magnetically-controllable medium, which is disposed in a working space between the first and second members. The applied magnetic field changes the resistance force of the magnetically-controllable medium associated with relative movement, such as linear, rotational or curvilinear motion, between the first and second members in communication with the haptic interface device. As such, the variable output signal from the computer system controls the strength of the applied magnetic field, and hence the variable resistance force of the magnetically-controllable medium. The resistance force provided by energizing the magnetically-controllable medium controls the ease of movement of the haptic interface device among a plurality of positions. Thus, the present haptic interface system provides an operator of an interactive program with realistic force feedback sensations through the magnetically-controllable device that opposes the movement of the haptic interface device.

In a preferred embodiment, the magnetically-controllable medium within the magnetically-controllable device is contained by an absorbent element disposed between the first and second member. The absorbent element may be compressed from a resting state, preferably in the amount of about 30%–70% of the resting state. The absorbent element may be formed as a matrix structure having open spaces for retaining the magnetically-controllable medium. Suitable materials for the absorbent element comprise open-celled foam, such as from a polyurethane material, among others.

The magnetically-controllable medium is a medium having a shear strength that varies in response to the strength of an applied magnetic field. One preferred type of magnetically-controllable medium is a magnetorheological fluid. As mentioned above, the magnetic-field generating device provides the applied magnetic field. The magnetic-field generating device is preferably a coil and comprises a wire having a number of turns and a certain gauge. The number of turns and gauge of the wire are dependent upon the desired range of the variable strength magnetic field and upon the electric current and voltage of the variable output signal.

The haptic interface device of the present invention may be any device in operative contact with the operator for controlling and responding to the interactive program, such as a video game. For example, a suitable haptic interface device may comprise a steering device and a joystick.

The computer system may comprise a host computer, a controller and an amplifier. The controller and amplifier, as is explained below, may alternatively be separate components or part of a haptic interface unit. The host computer comprises a processor that runs the interactive program. The controller comprises a microprocessor and firmware that are used to modify the variable input signal received from the sensor and the variable output signal received from the host computer. The controller then provides a modified variable input signal to the host computer and a modified variable output signal to the magnetically-controllable device. The modification function performed by the controller enables communication between the host computer and the magnetically-controllable device and the sensor. The amplifier further modifies the output signal to provide an amplified variable output signal in situations where the output signal from host computer is not sufficient to control the magnetically-controllable device. Further, the controller and amplifier may act as local processors, reducing the burden on the host computer by providing output signals for certain input signals, such as to provide reflex-like resistance forces, that do not need to be processed by the host computer.

In one embodiment, the present invention discloses a haptic interface unit comprising the magnetically-controllable device, as described above, adapted to provide a variable resistance force in proportion to a received variable output signal generated by a computer system processing an interactive program. The magnetically-controllable device further comprises a magnetic-field generating device, first and second members, and a magnetically-controllable medium. The magnetic-field generating device is energizable by the variable output signal to provide a variable strength magnetic field. The first and second members are adjacent to the magnetic field generating device. The magnetically-controllable medium is disposed between the first and second members, where the magnetically-controllable medium provides the variable resistance force in response to the variable strength magnetic field. Additionally, the haptic interface unit may further comprise a haptic interface device, adapted to be in operable contact with the operator, for controlling and responding to the interactive program. The haptic interface device is in communication with the magnetically-controllable device and has a plurality of positions, wherein an ease of movement of the haptic interface device among the plurality of positions is controlled by the variable resistance force. Finally, the haptic interface unit may further comprise a control unit that provides a signal to the magnetically-controllable device to control the variable resistance force.

BRIEF DESCRIPTION OF THE DRAWINGS

FIG. 7b is a top view of the sensor which interconnects to the plates of FIG. 7a;

FIG. 8a is a perspective view of yet another embodiment of a haptic interface unit;

FIG. 8b is a side view of the rack of FIG. 8a;

DETAILED DESCRIPTION OF THE INVENTION

Figure 1:
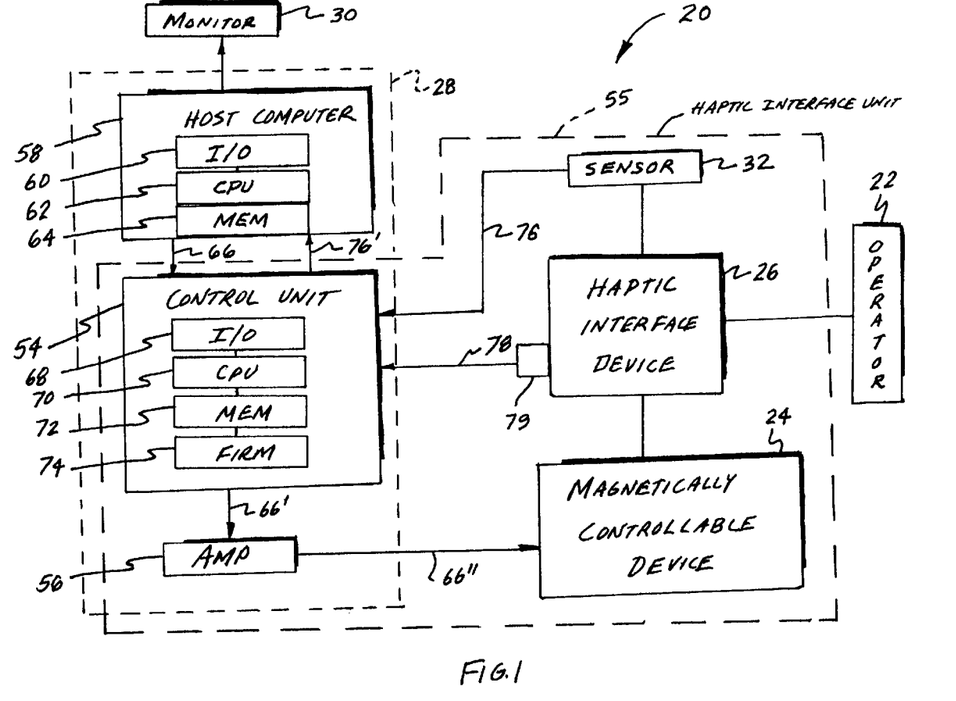
FIG. 1 is a schematic block representation of a haptic interface system according to the present invention.

According to the present invention a semi-active haptic interface system 20 is illustrated in FIG. 1. The semi-active haptic interface system 20 provides resistance forces to an operator 22 and comprises a magnetically-controllable device 24 that imparts force feedback resistance sensations to the operator through a haptic interface device 26 by opposing the movement of the haptic interface device. Operator 22 moves haptic interface device 26 to control and respond to an interactive program run by computer system 28, with corresponding images displayed on video display 30. A sensor 32 detects the movements of haptic interface device 26 and reports the movements to computer system 28. Computer system 28 interactively responds by generating new images on display 30 and by controlling magnetically-controllable device 24 to provide a variable resistance force corresponding to the movement of haptic interface device 26 and corresponding to the images on the display 30. Thus, haptic interface system 20, and particularly magnetically-controllable device 26, advantageously provide a simple, cost-effective, high-performance solution for supplying a semi-active resistance force enabling operator 22 to feel realistic force feedback sensations.

The semi-active feature of haptic interface system 20 of the present invention is particularly beneficial in providing a very cost-efficient, compact and robust system. As used herein, the term "semi-active" refers to the ability to provide a dissipative opposing resistance force in response to an applied motion. In contrast to prior art haptic interface systems that provide "active" force feedback utilizing expensive motors, haptic interface system 20 of the present invention advantageously utilizes magnetically-controllable device 24 including a magnetically controllable medium 34 (FIG. 2A) to provide semi-active, variable resistance forces. The term "active" refers to the ability to independently impart a force to the haptic interface device without requiring the operator to move the device. Through continual feedback between haptic interface device 26 and computer system 28, the computer system directs magnetically-controllable device 24 to provide variable resistance forces that oppose the movement of the haptic interface device 26. Further, based on running the interactive program, computer system 28 directs the resistance provided by magnetically-controllable device 24 to vary in conjunction with images on display 30 and with the movement of the haptic interface device 26.

For example, if the computer system 28 is running a race car driving interactive program, and operator 22 attempts to move haptic interface device 26 in a direction that steers the car into a non-destructible wall, then the computer system will provide a control signal. The signal controls magnetically-controllable device 24 to provide resistance forces equal to or greater than the force applied to the haptic interface device by the operator. This opposes any movement of the haptic interface device and simulating the feel of driving into an immovable wall.

Similarly, given the same interactive race car driving program and operator 22 driving the car around a curve, computer system 28 provides a variable amount of resistance force less than the force applied by operator 22 to haptic interface device 26 to simulate the actual centrifugal and friction forces. The amount of the variable resistance force depends upon the speed and traction of the car and the sharpness of the curve, for example. As a result, magnetically-controllable device 24 creates resistance force feedback sensations felt by operator 22 through haptic interface device 26, giving the interactive program a realistic feel. Thus, as operator 22 maneuvers haptic interface device 26, the system of the present invention supplies resistance to oppose the motion of the haptic interface device to simulate real-life forces.

Figure 2A:
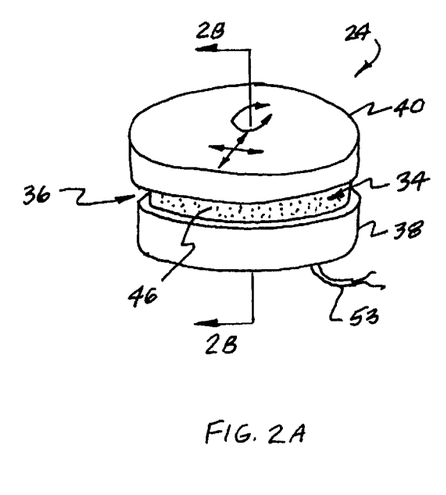
FIGS. 2A–2B are a perspective view and a cross-sectional view, respectively, of a typical magnetically-controllable device.
Figure 2B:
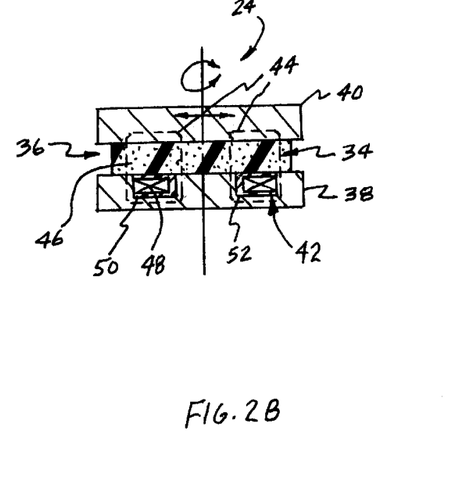

Magnetically-controllable device 24 beneficially contributes to the costefficient, compact and robust design of haptic interface system 20. Referring to FIGS. 2A and 2B, a typical magnetically-controllable device 24 generally comprises a magnetically-controllable medium 34 contained in a working space 36 between first member 38 and second member 40. Members 38, 40 are disposed for relative movement along the mating surfaces, such as linear or rotational motion as indicated by the arrows. Magnetically-controllable medium 34 is under the influence of a annular-shaped magnetic-field generating device 42 (FIG. 2B) energizable to produce a variable strength magnetic field across the medium. Magnetically-controllable medium 34 is a medium that has a shear strength that changes in proportion to the strength of an applied magnetic field. In other words, the "apparent viscosity" of the medium changes proportionally with the strength of an applied magnetic field, providing controllable shear force to resist relative movement between members 38, 40.

A suitable magnetically-controllable medium 34 may comprise magnetorheological fluids such as described in commonly assigned U.S. Pat. Nos. 5,683,615 and 5,705,085 hereby incorporated by reference. Other fluids, such as carbonyl iron dispersed in hydrocarbon oil, or and any medium exhibiting a change in properties in response to an applied magnetic field. Other magnetorheological fluids which may be used in the present invention are disclosed in, for example, U.S. Pat. No. 5,382,373 to Carlson et al. and U.S. Pat. No. 5,578,238 to Weiss, et al., hereby incorporated by reference.

First 38 and second 40 members are adjacent to magnetic-field generating device 42, and disposed at least partially on opposing sides of magnetically-controllable medium 34. Members 38, 40 each preferably include a highly magnetically permeable material, such as a magnetically soft steel such as AISI 1010, AISI 1018 or AISI 12L14 in order to act as pole pieces to produce a magnetic field across medium 34, as indicated by flux lines 44. Additionally, second member 40 is in communication with haptic interface device 26 (FIG. 1), such that operator 22 moving the haptic interface device during energization of magnetic-field generating device 42 feels the changed resistance force generated between first 38 and second 40 members by magnetically-controllable medium 34. Significant shear force resisting the relative movement of first member 38 and second member 40 can advantageously be obtained with a small amount of magnetically-controllable medium 34 between movable members 38, 40. Thus, a variety of relative movements, such as linear, rotational, curvilinear, and pivoting, that include shear movement between two members can be controlled by a magnetically-controllable device according to the present invention.

Additionally, magnetically-controllable device 24 preferably contains substantially the entire amount of magnetically-controllable medium 34 at working space 36. Any suitable means for containing medium 34 at working space 36 can be used. According to a preferred embodiment of the invention, means for containing magnetically-controllable medium 34 within working space 36 comprises an absorbent element 46. Absorbent element 46 is a material that can take up and hold magnetically-controllable medium 34, for example by wicking or capillary action. Absorbent element 46, disposed between first member 38 and second member 40, preferably has a matrix structure with open spaces for retaining magnetically-controllable medium 34. While magnetically-controllable medium 34 is held within the spaces in absorbent element 46, the material itself may or may not be absorbent. A complete description of such devices may be found in U.S. patent application Ser. No. 08/959,775 to Carlson filed Oct. 29, 1997 entitled "Controllable Medium Device And Apparatus Utilizing Same."

A particularly preferred absorbent element 46 is a sponge-like material, for example, an open-celled foam or partly open-celled foam. Suitable materials for making such a foam comprise polyurethane, rubber, silicone rubber, polyamide, neoprene, loner, melamine, polyimide high temperature foam, and metal foam. Additionally, other exemplary absorbent materials include felts, including felts mad of material such as Nomex® aramid fiber, polybenzimadazole fiber, Teflon® fiber and Gore-Tex® fiber, fiberglass wicking, and woven brake or clutch lining material. Other materials and structures are also suitable, such as a metal mesh, a brush, or a flocked surface material.

Absorbent element 46 also beneficially allows for reduced tolerances between the components of magnetically-controllable device 24, thereby reducing cost. In order to negate the affects of wear at the surface of absorbent element 46, and to provide a robust design, it is desirable to have the material compressed between member 38, 40. Absorbent element 46 may be utilized without any compression, but the material is preferably compressed between about 30% and 70% from a resting state to its installed state. Thus, by containing substantially the entire amount of controllable medium 34 at working space 36 and allowing for wear and tear of absorbent element 46, the present invention avoids the need to provide a large quantity of medium, and the associated seals, bearings and containing devices of the prior art. Accordingly, the present invention reduces the tight tolerances formerly needed on all components.

Absorbent element 46 is preferably fixed to one of the relatively moving members 38, 40 to insure that it remains disposed in the working space 36. According to a preferred embodiment, absorbent element 46 is adhesively bonded using a pressure sensitive adhesive to one of the members. One preferred absorbent element 46 is polyurethane foam having a pressure sensitive adhesive on one side. The foam may be readily attached to one member by the adhesive. Alternatively, absorbent element 46 may be shaped so that it is held in place by the structure of the member, for example, a tubular shaped foam material may be fitted around a member as a sleeve. Finally, absorbent element 46 does not need to fill working space 36.

Referring to FIGS. 2A–2B, magnetic-field generating device 42 preferably comprises at least one coil 48 formed of an electrically-conducting wire wound about a retainer 50, such as a plastic bobbin or spool. The windings of wire forming coil 48 are wound such that energizing the coil with electricity produces an induced magnetic field, represented by flux lines 44, that intersects magnetically-controlled medium 34. The induced magnetic field is proportional to the electric current supplied to energize the coil 48, such as from the output signal of computer system 28 and number of turns of wire. The wire forming coil 48, as will be realized by one skilled in the art, may be selected from a broad range of electrically-conducting materials, depending on the range of the desired magnetic field strength, the range of desired electrical current, space constraints, and desired operating voltage. For example, wire may comprise materials such as copper, aluminum, gold, silver and the like. Similarly, the gauge of the wire and the number of windings within coil 48 are dependent upon the application, and can be determined by methods known by one skilled in the art.

Magnetic field generating device 42 may be adjacent first member 38 or second member 40, but is preferably disposed within a recess 52, such as annular recess shown, formed within one of members (shown within first member 38 in FIG. 2B). The lead wires 53 (FIG. 2A) connecting to coil 48 are connected to computer system 28 (FIG. 1), which provides a signal 66' (FIG. 1) to energize the coil, as is discussed in further detail below. Because the wires 53 connecting coil 48 may be mounted to a moving member, there may be a need to restrict the movement of that member in order to avoid breaking the wire by excessive stretching, bending or rotation of the wires. Alternatively, means may be provided to enable a connection to computer system 28 even with excessive linear, rotational, pivotal or curvilinear movement. For example, a slip-ring connector, a wire take-up reel, and a coiled wire may be utilized to allow for great amounts of movement while maintaining a reliable connection. These alternatives are generally more costly, however, and thus are not as desirable for a cost efficient haptic interface system.

Referring to FIG. 1, magnetically-controllable device 24 is preferably integrated with haptic interface device 26 and sensor 32 to comprise a haptic interface unit (as represented by the dashed line 55). The haptic interface unit 55 may additionally comprise a control unit 54 and/or a signal amplification device 56, as will be discussed in more detail below. The haptic interface unit 55 may further comprise a protective housing or shell within which each of the above-mentioned components are mounted.

Haptic interface device 26 may be any device in operable contact with operator 22. Operator 22 maneuvers haptic interface device 26 to control and respond to the interactive program processed by computer system 28. A suitable haptic interface device 26 may comprise a steering wheel, a joystick, a steering yoke, a seat, a motor bike frame, a jet ski frame, a downhill ski frame, amusement part ride, and any other device in operable contact with operator 22.

Sensor 32 is in communication with haptic interface device 26 for identifying a detected position within any of the plurality of positions within which the haptic interface device may be moved. Sensor 32 provides a variable input signal to computer system 28 based on the detected position. Because haptic interface device 26 may be continually moving, sensor 32 must quickly provide computer system 28 with an updated detected position of the haptic interface device 26 in order to allow the computer system 28 to update its output signal to provide a realistic feel to the interactive program. Ideally, sensor 32 provides computer system 22 with a continuous signal that varies in proportion to the movement of the detected position of the haptic interface device 26.

Suitable sensors may comprise a potentiometer, such as Clarostat 10K ohm potentiometer, an optical encoder, such as a Clarostat Series 6000 optical rotary encoder, or any type of rheostat or variable resistor. For example, sensor 32 may be mounted on a shaft connected to a steering wheel to detect the rotation of the steering wheel. Also, more than one sensor 32 may be required to detect complex movements of haptic interface device 26. For example, if haptic interface device 26 is a joystick, one sensor 32 may be connected to a component of the joystick to determine a movement in the x-direction, while another sensor 32 may be connected to another component of the joystick to determine a movement in the y-direction. In this example, the x-direction sensor and the y-direction sensor may each send a variable input signal to computer system 28.

Computer system 28 receives the variable input signal from sensor 32 and provides a variable output signal to magnetically-controllable device 24. As discussed above, there is a continual feedback loop between computer system 28 and haptic interface device 26, and hence between host computer 58, magnetically-controllable device 24 and sensor 32. The interactive program being processed by host computer 58 uses the variable input signal from sensor 32 as an input to the interactive program. Based upon this input, the host computer 58 further processes the interactive program to determine the variable output signal to send to magnetically-controllable device 24. For example, the interactive program within host computer 58 processes an input signal from sensor 32. From this, the host computer 58 determines a semi-active resistance force required from magnetically-controllable device 24 in order to coordinate what operator 22 is viewing on display 30 with what the operator is feeling through haptic interface device 26 in order to simulate real-life sensations. Host computer 58 sends a signal to display 30 to update the displayed image, and concurrently sends a output signal to magnetically-controllable device 24. The output signal sent to magnetically-controllable device 24, for example, may be an electric current having a value in proportion to a resistance force desired to be felt by operator 22. Thus, in attempting to move haptic interface device 26, operator 22 feels the change in resistance force applied by magnetically-controllable device 24 through the haptic interface device, thereby providing force feedback sensations.

While, in general, computer system 28 receives a variable input signal from sensor 32 and generates a variable output signal to magnetically-controllable device 24, a number of different components may be involved in the signal transactions. Computer system 28 may comprise host computer 58, and may further include control unit 54 and amplification device 56 to communicate with haptic interface device 26. Host computer 58 typically includes an input/output 60 for sending/receiving electrical signals, a processor 62 and a memory 64 for respectively processing and storing electrical signals representative of an interactive program, for example. A suitable host computer 58 is, for example, a personal computer such as a IBM, Compaq, Gateway or other suitable computer capable of processing the appropriate information. Input/output 60 may comprise a plurality of serial and/or parallel communication ports, such as RS-232 type ports, and high-speed bi-directional communication channels like the Universal Serial Bus (USB). Processor 62 may comprise an Intel Pentium® or other suitable microprocessor. Memory 64 may comprise Random Access Memory (RAM) and Read-Only Memory (ROM), as well as other well-known types of memory. As one skilled in the art will appreciate, depending upon the particular application, there is a broad range of personal computers, input/outputs, processors and memories that may be utilized with the present invention.

For example, host computer 58 may send output signal 66 comprising an electric current proportional to a desired resistance force to be applied to haptic interface device 26. Output signal 66 may be received by control unit 54 for additional processing. Control unit 54 may be a microcomputer having an input/output 68, a processor 70 for processing electrical signals, a memory 72 for storing electrical signals, and/or firmware 74 that stores and processes electrical signals, where the electrical signals are representative of a local interactive program or inputs from other devices with system 20. Input/output 68, processor 70, and memory 72 may be substantially similar to those described above for host computer 58, however, the capabilities of control unit 54 may be more limited to reduce cost. Control unit 54 processes output signal 66 from host computer 58 and provides a modified output signal 66'.

Additionally, control unit 54 may locally process signals or portions of signals directly received from components within system 20. For example, control unit 54 may receive variable input signal 76 from sensor 32 and search the signal for portions that may be processed locally before passing the input signal on to host computer 58 as modified variable input signal 76'. Also, control unit 54 may provide modified input signal 76' to place input signal 76 in a format that may be understood or processable by host computer 58. Further, control unit 54 may receive input signal 78 from haptic interface device 26, such as a signal from a button or trigger 79 on the haptic interface device. Input signal 78 may be a signal that requires a reflex-like response, such as the firing of a gun. Rather than burdening host computer 58 with processing these types of signals, which may be very frequent, control unit 54 provides the processing capability. Input signal 78 may be completely processed by control unit 54, thereby advantageously reducing the processing burden on host computer 58. Thus, the use of control unit 54 increases the efficiency of system 20 by performing force feedback computations in parallel with the force feedback computations being performed by host computer 58 in running the interactive program.

Similarly, control unit 54 may receive concise high-level commands, comprising all or a portion of output signal 66, to be processed locally within the control unit 54. These high-level commands may represent simple, semi-active, variable resistance force sensations that may be easily processed locally by control unit 54. Thus, in effect, control unit 54 provides a parallel processing capability to host computer 58 to maximize the overall efficiency of system 20.

Modified variable output signal 66' provided by control unit 54 may require further processing before being received by magnetically-controllable device 24. Modified output signal 66' may be received by amplification device 56, for example, to boost the level of modified output signal 66' to provide amplified output signal 66". Modified output signal 66' may be a variable signal of low electrical current that is not sufficient to properly energize coil 48 to produce a magnetic field to the desired strength to provide the desired resistance forces. To solve this problem, amplification device 56 proportionally increases the strength or amperage of modified output signal 66' to a level sufficient to properly energize coil 48. Thus, amplification device 56 advantageously allows lower strength signals to be processed within system 20, thereby saving cost by requiring less heavy duty components and less power, before boosting the signal to a level required to properly energize magnetically-controllable device 24.

As mentioned above, control unit 54 and amplification device 56 may be a part of computer system 28 or the haptic interface unit or they may be separate components within system 20. Those skilled in the art will realize that the various components described above may be combined in numerous manners without affecting the operability of the system. Similarly, some of the components, such as control unit 54 amplification device 56, may not be required if their function can be adequately performed by other system components, such as host computer 58. Thus, variation of the above-described configuration of system 20 is contemplated by the present invention.

Haptic interface system 20 comprises two closely coupled, interactive functions: a sensory input function and a force output function. The sensory input function tracks the operator's manual manipulation of the haptic interface device, feeding sensory data to the host computer representative of those manipulations. The force output function provides physical feedback to the operator in response to commands from the host computer. These two functions are intertwined in that the sensory input function generally varies in response to the force output function, and vice versa. In other words, the operator's manipulations of the haptic interface device are affected by the applied resistance forces, or force feedback, and the applied resistance forces are dependent upon the manipulations of the operator. Thus, haptic interface system 20 involves a very complex and continual interaction.

In operation, host computer 58 runs an interactive program, such as a game, using processor 50 to generate a video signal 80 received by display 30. Video signal 80 is an electrical signal used to generate an image, corresponding to an event occurring within the game, on display 30. Operator 22 responds to the event by moving haptic interface device 26, such as a steering wheel or a joystick, in conjunction with the viewed event. Sensor 32 sends variable input signal 76 comprising tracking information representing the position of the wheel or joystick to control unit 54. Control unit 54 may respond to the information by processing the information locally, and by forwarding the information, or a modified form of the information, as a modified variable input signal 76' to host computer 58. Even when processing information locally, control unit 54 may provide modified variable input signal 76' to host computer 58 and/or display 30 to update the generated image of the event to correspond with the latest input.

Host computer 58 receives modified variable input signal 76' from control unit 54 and inputs that information into processor 50 that is running the interactive game. Host computer 58, based on the processing of modified input variable signal 76', updates the image of the event generated on display 30 and provides a variable output signal 66 in proportion to a resistance force to be felt by operator 20 in moving the wheel or joystick. Variable output signal 66 may be modified by control unit 54 and amplified by amplification device 56 before reaching magnetically-controllable device 24 as amplified variable output signal 66". The strength of amplified variable output signal 66" varies in proportion to a desired magnetic field strength, and hence resistance force, as computed by host computer 58 to coordinate with the interactive program.

Again referring to FIGS. 1 through 2B, variable output signal 66" thereby energizes coil 48 within magnetically-controllable device 24 to produce a magnetic field. The magnetic field is applied across working space 36, affecting the shear strength of magnetically-controllable medium 34 contained within absorbent element 46. The affect on the shear strength of medium 34 creates a semi-active, resistance force between first 38 and second 40 members, which is connected to haptic interface device 26. As a result, operator 22 feels the changed resistance force through haptic interface device 26 during attempted movements of the haptic interface device. Thus, haptic interface system 20 provides opposing force feedback sensations, or resistance forces, to operator 22 maneuvering haptic interface device 26 to simulate a realistic feel. For example, the following feels may be simulated: jolting blasts, rigid surfaces, viscous liquids, increased gravity, compliant springs, jarring vibrations, grating textures, heavy masses, gusting winds, and any other physical phenomenon that can be represented mathematically and computed by computer system 28.

The following comprises a number of different embodiments employing the teachings of the present invention. Where elements are substantially the same as those discussed above, they are given the same reference numeral. Based on the variety of mechanisms utilized by various manufacturers to reduce the movement of a haptic interface device into manageable and measurable components, such as movements in an x-direction and a y-direction, numerous configurations of haptic interface systems utilizing the teachings of this invention may be employed. Thus, these examples are not intended to be limiting, but are exemplary of the teachings of the present invention to numerous embodiments of haptic interface systems.

In general, the movement of a haptic interface device 26 is either linear or rotary, which includes partial rotation or curvilinear motion. Similarly, a magnetically-controllable device 24, as mentioned above, is capable of providing opposing variable resistance force to either linear or rotary movements, including partial rotation or curvilinear motion. To control the movements of the haptic interface device 26, the magnetically-controllable device 24 must somehow be linked to the haptic interface device 26. As such, the linking mechanisms typically translate the following types of movement from the haptic interface device 26 to the magnetically-controllable device 24: linear to linear; linear to rotational; rotational to rotational; and rotational to linear. Hence, the configuration of the haptic interface unit may vary, and the configuration of the magnetically-controllable device 26 may vary, depending on: the mechanisms used to resolve the movement of the haptic interface device 26; space constraints; resistance force and/or torque requirements; and cost constraints. Therefore, the teachings of the present invention may be applied to a plurality of different configurations with equal success.

Figure 3:
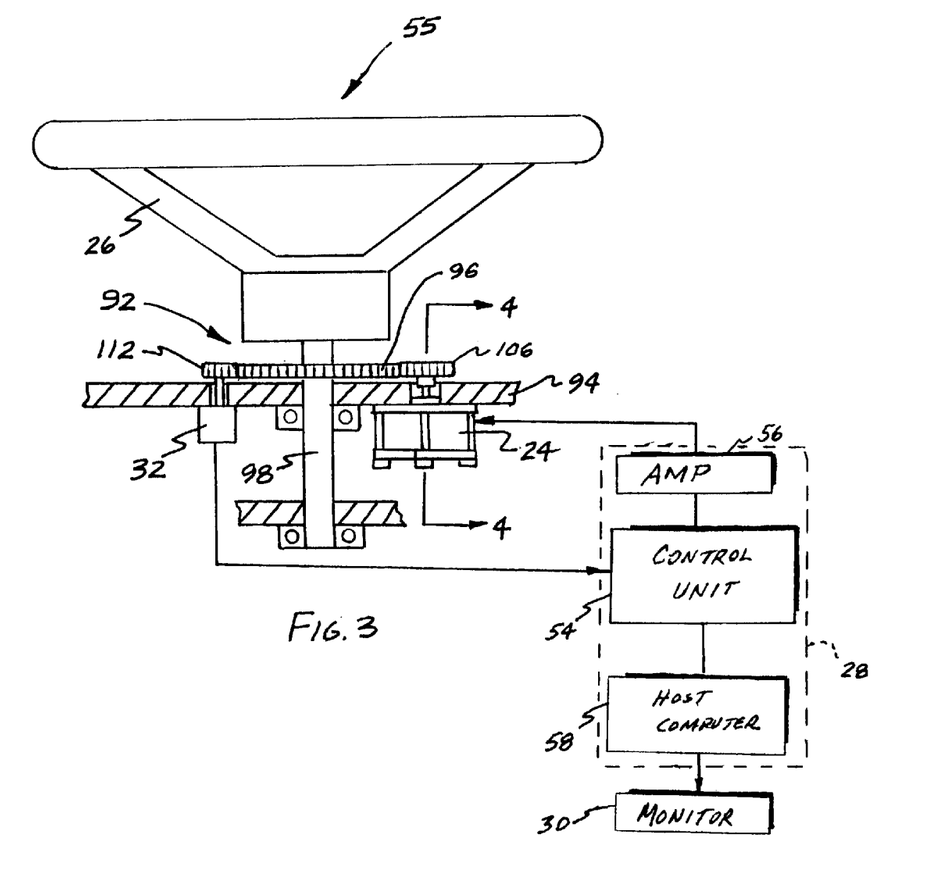
FIG. 3 is a partial cross-sectional view of one embodiment of a haptic interface unit.

Referring to FIG. 3, one embodiment of the present invention comprises haptic interface unit 55 having a magnetically-controllable device 24 that is adapted to apply resistance forces to haptic interface device 26 through drive mechanism 92. Drive mechanism 92 may be driven by an operator 22 (FIG. 1) in operable contact with haptic interface device 26, such as the steering wheel shown. Sensor 32 is in rotary contact with drive mechanism 92 to determine and report the position of the drive mechanism, which corresponds to the position of haptic interface device 26. Haptic interface unit 55 further comprises a frame 94 to which magnetically-controllable device 24 and sensor 32 are fixedly mounted, and to which drive mechanism 92 is movably mounted, such as with a low friction element like bearings, bushings, sleeves or the like.

Drive mechanism 92 comprises a disc 96 fixedly attached to shaft 98. Disc 96 is configured to engage magnetically-controllable device 24 and sensor 32 during rotation of steering wheel 26. Disc 96 may comprise a round disc, or only partial segments of a round disc if limited rotation is desired. Disc 96 may comprise peripheral gear teeth as shown or a high-friction surface to engage magnetically-controllable device 24 and sensor 32.

Figure 4A:
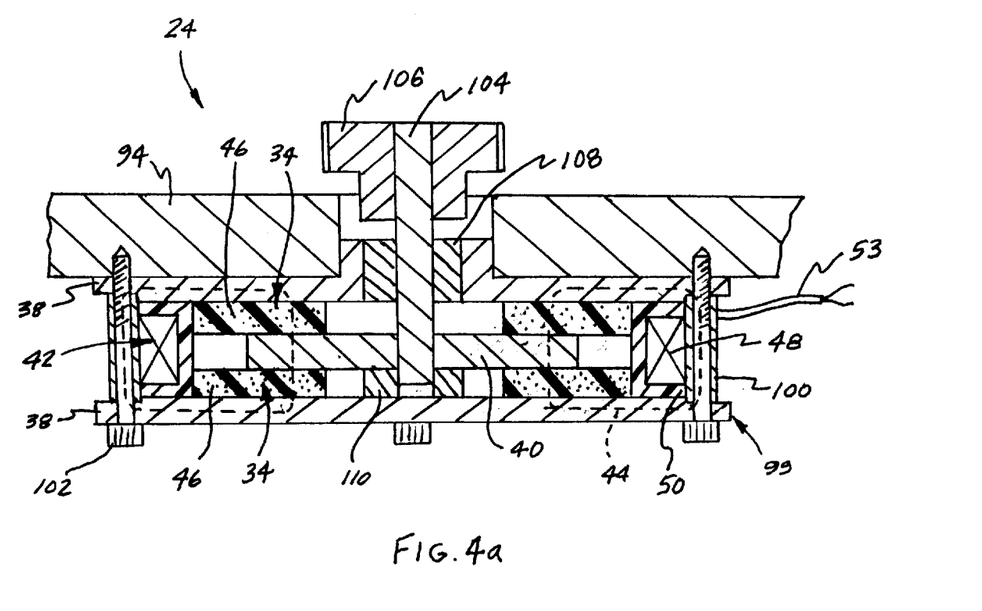
FIG. 4a is a cross-sectional view along line 4—4 in FIG. 3 of one embodiment of a magnetically-controllable device.

Referring to FIG. 4a, the magnetically-controllable device 24 of FIG. 3 is shown in cross section and comprises a pair of first plate members 38 disposed adjacent to both sides of rotating, disc-like second member 40. Annular ring member 100, comprising a high magnetic permeability material, forms a peripheral wall around second member 40 and combines with first member 38 to form a housing 99. Fastening means 102 may be employed in a plurality of places to hold together the components of the magnetically-controllable device 24. Fastening means 102 may comprises screws, clamps, bonding or any other method for holding together the components of device 24. Further holding means may fasten the device 24 to the frame 94.

An absorbent element 46 which is preferably a disc shaped ring containing magnetically-controllable medium 34 is sandwiched in two places between first member 38 and second member 40. Magnetic-field generating device 42, including coil 48 wound about retainer 50 is disposed adjacent first member 38 and second member 40 at the periphery of magnetically-controllable device 24. The coil 48 is connected by lead wires 53 to the computer system 28 (FIG. 3). Thus, a magnetic field represented by flux lines 44 is produced upon the energization of magnetic-field generating device 42.

Shaft 104 extends through and is fixedly secured to the second member 40 and interconnects at one end to disc 96 (FIG. 3) through engaging member 106, such as a wheel, gear or pinion. Engaging member 106 is fixedly attached to shaft 104, such as by a force fit, a set screw, a adhesive or welded bond, a pin, and any other suitable method of holding the engaging member in a fixed relationship to the shaft. Engaging member 106 may have peripheral gear teeth or a high friction surface complementary to the periphery of disc 96. A first bearing member 108 is disposed on shaft 104 between engaging member 106 and second member 40. First bearing member 108 allows for the rotation of shaft 104 and supports the shaft against radial loads relative to the first member 38. A suitable bearing member 108 may comprise a roller bearing, a sleeve or washer of a low friction material such as nylon or Teflon®, or other suitable mechanisms. A second bearing member 110 is disposed at the other end of shaft 104, on the opposing side of second member 40. Second bearing member 110 provides radial support for shaft 104 and second member 40. A suitable bearing member 110 may comprise a thrust bearing, a sleeve or washer of a low friction material such as nylon or Teflon®, and other similar mechanisms.

Disc 96 and engaging member 106 are sized so that the ratio of their diameters is in a range of ratios that allows magnetically-controllable device 24 to provide a suitable amount of resistance force. Similarly, the ratio of the radius of disc 96 and the radius of engaging member 112 fixedly connected to shaft of sensor 32 (FIG. 3) similar to engaging member 106, must be calibrated to insure proper system performance.

Figure 4B:
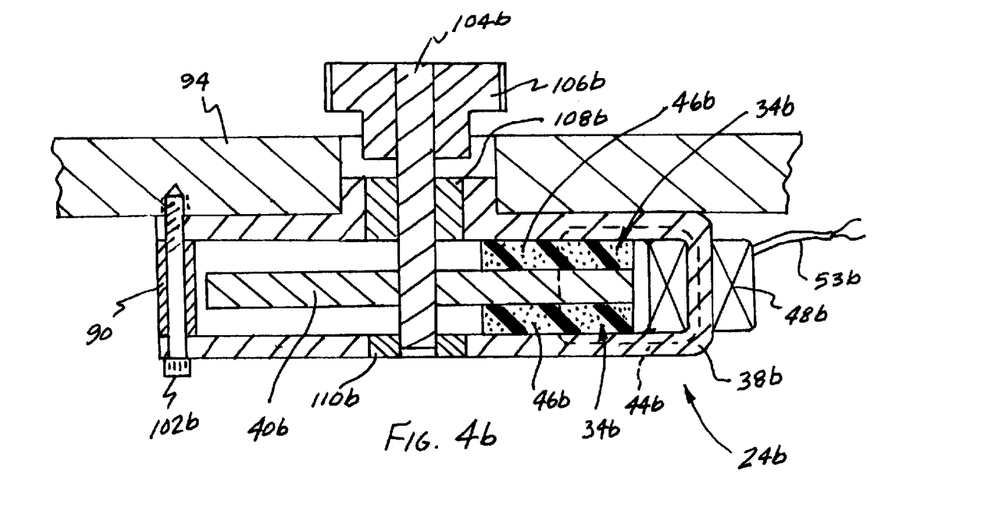
FIG. 4b is a cross-sectional view of an alternate embodiment of a magnetically-controllable device.

FIG. 4b illustrates an alternate embodiment of magnetically controllable device 24b which may be used in place of the device 24 of FIG. 4a. In this device, the shaft 104b is radially supported in a U-shaped first member 38b by bearings 108b, 110b. Engagement member 106b engages disc member 96 of FIG. 3. The device 24b attaches to the frame 94 by fastening means 102b received through the ends of first member 38b and through spacer 90. Disc-shaped second member 40 is locked by means of a press fit on shaft 104b and rotates therewith. Localized absorbent elements 46b are positioned on either side of second member 40b and are preferably open celled polyurethane foam adhesively secured to the insides of first member 38b. Magnetically-controllable medium 34b is retained by the elements 46b.

Upon energizing the magnetic field generator 42b by providing electrical current to lead wires 53b which interconnect to a coil 48 wound about the first member 38, a magnetic flux 44 is created which is carried by the first member 38b and traverses the elements 46b retaining the medium 34b. This energization changes the rheology of the medium and creates a resistance force that acts to prevent relative rotation between the members 38b, 40b thereby providing resistance forces to the operator 22 (FIG. 1).

Figure 5:
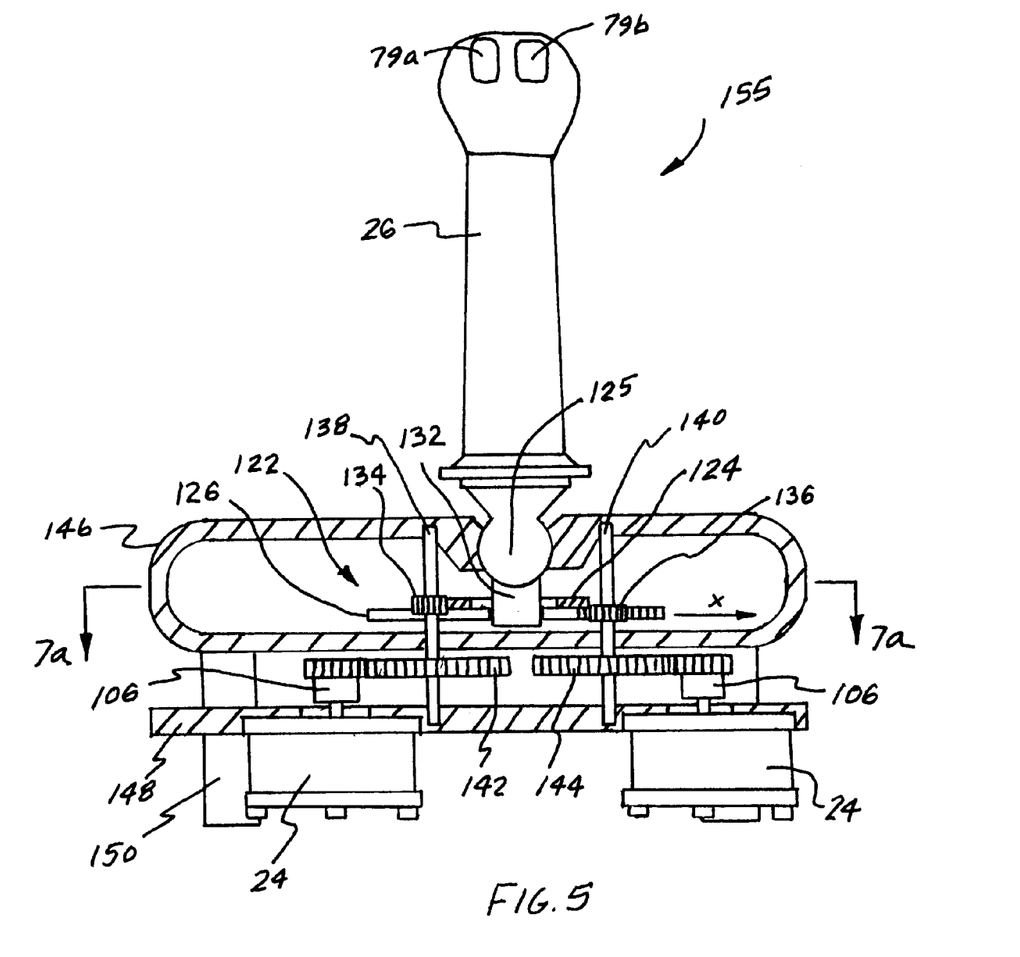
FIG. 5 is a partial cross-sectional rear view of another embodiment of a haptic interface unit, with some components removed for clarity, utilizing the magnetically-controllable device of FIGS. 3 and 4.
Figure 6:
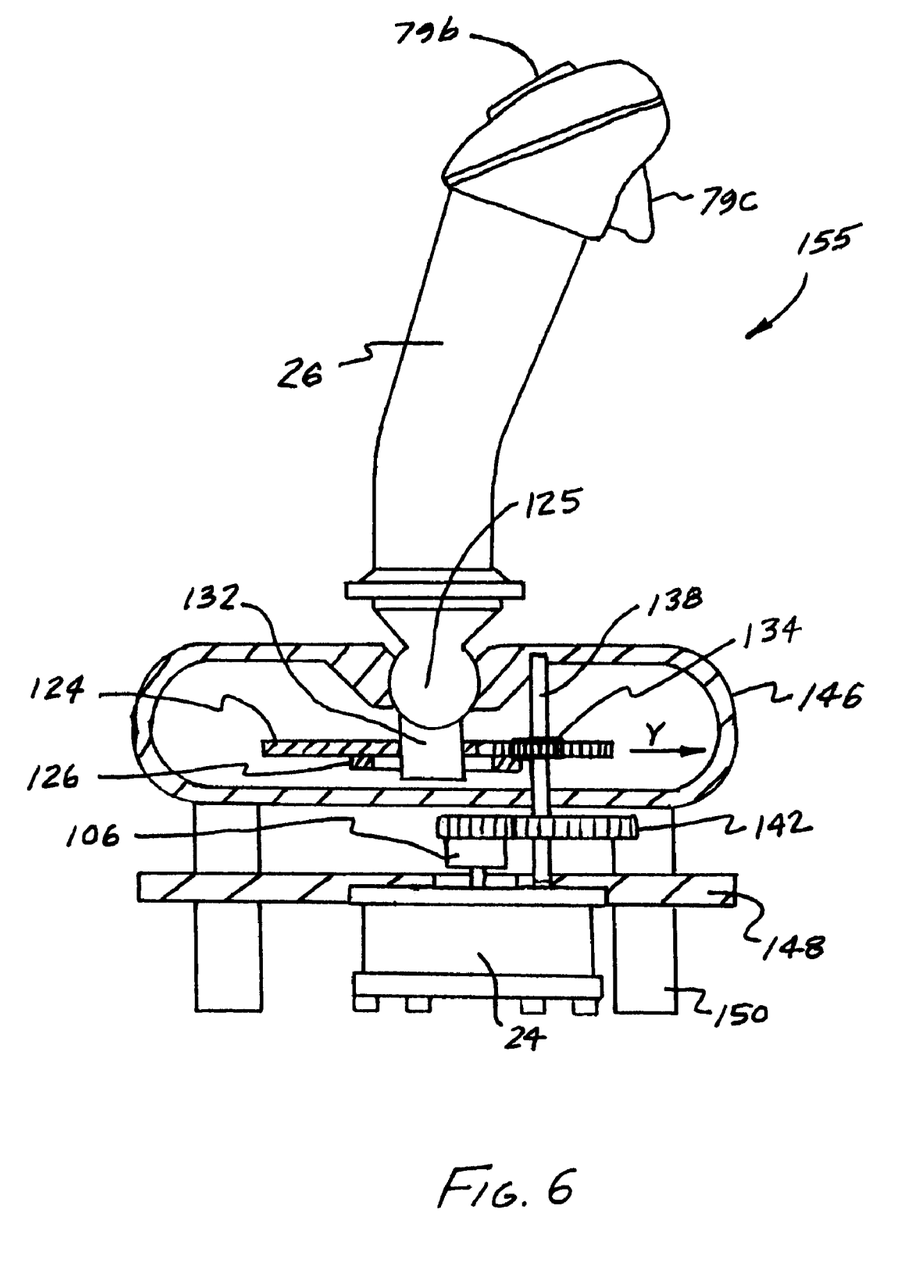
FIG. 6 is a partial cross-sectional side view of the haptic interface unit of FIG. 5, with some components removed for clarity.
Figure 7A:
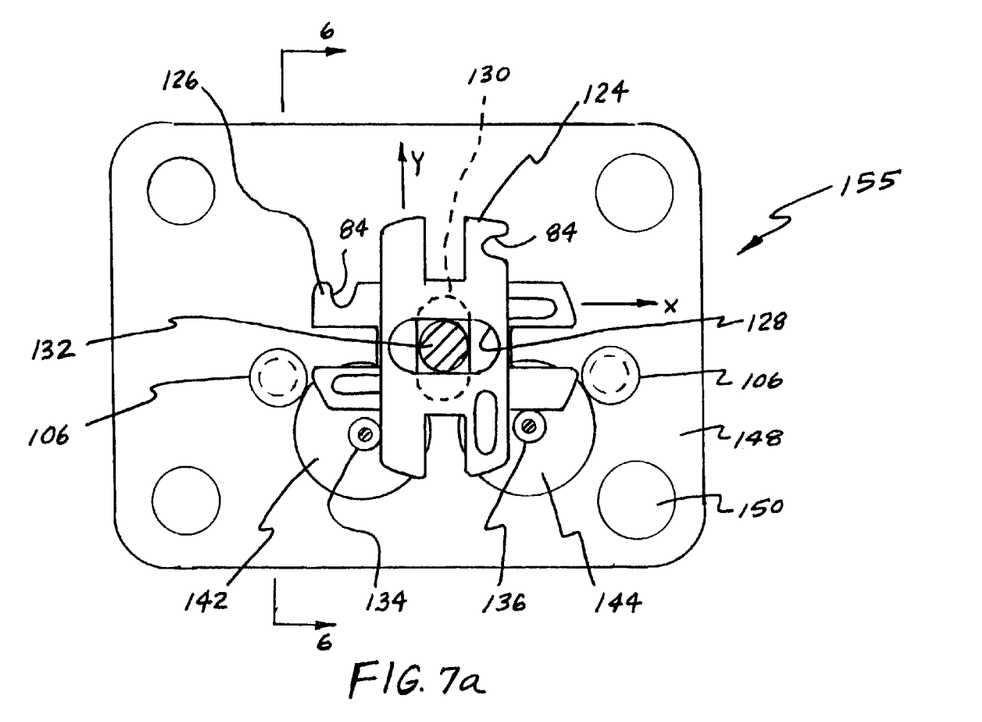
FIG. 7a is a partial cross-sectional top view taken along line 7a—7a of FIG. 5, with some components removed for clarity.
Figure 7B:
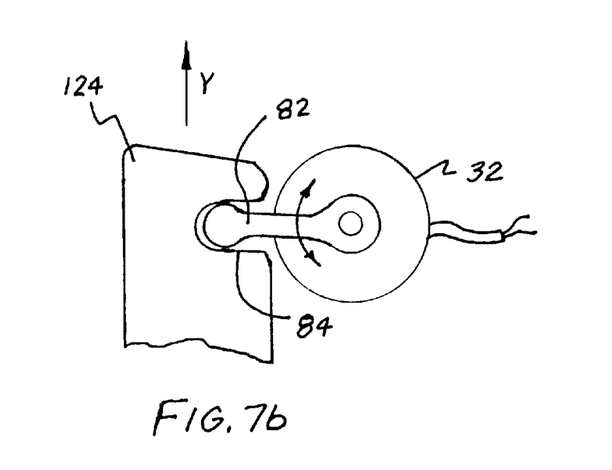

Referring to FIGS. 5–7b, another embodiment of the present invention comprises haptic interface unit 155 (control unit and amp not shown for clarity) utilizing a pair of magnetically-controllable devices 24 as described above with reference to FIG. 4a. Alternatively, the brakes shown in FIG. 4b may be used. For clarity, some of the components of device 155 are not shown or shown separately, such as a pair of sensors 32 one of which is shown in FIG. 7b. In this embodiment, each magnetically-controllable device 24 is adapted to apply resistance forces to haptic interface device 26, such as a Gravis Pro joystick, through drive mechanism 122.

Drive mechanism 122 is in communication with haptic interface device 26 through first 124 and second 126 plates that translate in a y and x direction, respectively, responsive to the movement of the haptic interface device. Each plate 124, 126 comprises a groove 128 and 130 (FIG. 7) within which post 132 at the base of haptic interface device 26 moves. The post 132 is secured to, or integral with, the interface device 26 and moves with the interface device 26 about pivot 125. The movement of post 132 within the grooves 128, 130 resolves the motion of haptic interface device 26 into its respective y-direction and x-direction components. Each plate 124, 126 transfers its linear motion, corresponding to the y or x directions, through first 134 and second 136 wheels, respectively, which are fixedly attached to respective shafts 138, 140. As such, the linear motion of plates 124, 126 is converted to rotational motion in shafts 138, 140.

The rotational motion of shaft 138, 140 is then provided to each magnetically-controllable device 24 through respective engaging members 106 in contact with respective third 142 and fourth 144 wheels, fixedly attached to shafts 138, 140. Further, each shaft 138, 140 has one end rotatably mounted in housing 146 and the opposite end rotatably mounted in panel 148. Housing 146 and panel 148 may be manufactured from a variety of materials, such as plastics or metal. Legs 150, typically provided in four places, fixedly attach housing 146 and panel 148 and provide a base upon which interface unit 155 stands. Thus, the pair of magnetically-controllable devices 24 are able to apply semi-active, variable resistance forces to oppose movement of haptic interface device 26, such as a joystick, through drive mechanism 122.

It should be recognized that the housing 146 and panel 148 are merely exemplary and any suitable housing and support means may be utilized. Further, depending upon the torque achievable in the respective devices 24, the shafts 138 may be directly attached to devices 24. Moreover, other types of power transmission or gearing arrangements other than spur gears may be utilized, such as bevel gears, helical gears, worm gears and hypoid gears. Springs (not shown) may be provided that connect between the haptic interface device 26 and the housing 146 to spring bias the device in all directions and provide a return spring function, i.e., center the device.

Signals representative of the x and y motions are provided by respective sensors 32 including arm 82 received in recesses 84 in the plates 124, 126. Movement of the plates 124, 126 in the respective x and y directions rotates the respective arms 84 of sensors 32, which are preferably rotary potentiometers. This produces a signal corresponding to x and y motion which is processed by the control system to provide force feedback signal to the respective device 24. The one or more buttons or triggers 79a, 79b shown send additional signals to the control unit 54 (FIG. 1).

Figures 8A, 8B:
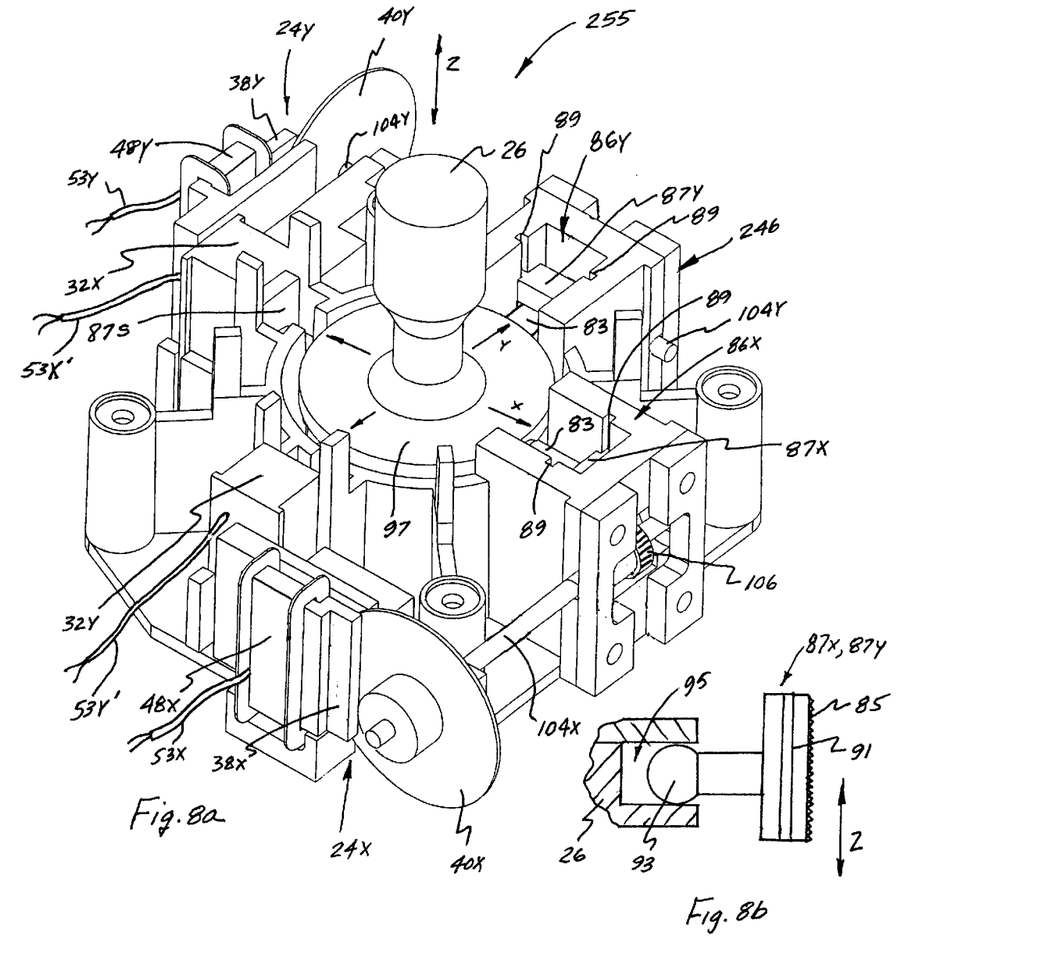

FIG. 8 illustrates another embodiment of haptic interface unit 255 with the cover portion of housing removed for clarity. The unit 255 comprises a haptic interface device 26 pivotally moveable to cause movements in the respective x and y directions or any combination thereof. Such movements of the device 26 cause respective movements in rack and pinion assemblies 86x, 86y. interconnected to respective magnetically controllable devices 24x, 24y. Assemblies 86x, 86y include a rack 87 and pinion 106. The rack 87 includes projections 91 which slide in slots 89 formed in the housing portion 246 thereby restricting motion to only along the z direction. A spherical ball 93 mounted on extension 83 is received in guide 95 formed in the haptic interface device 26.

Movement of the device 26 in the x direction, for example, pivots the device below flange 97 about a pivot point (not shown) and causes guide 95 to engage ball 93 to move rack 87x in the z direction. Likewise, movement of device 26 in the y direction causes guide 95 to engage ball 93 and move rack 87y in the z direction. Any z movements of racks 87x, 87y cause teeth 85 on the outer surface of racks 87x, 87y to engage teeth on pinions 106x, 106y. This rotates respective shaft 104x, 104y (not shown) and fixedly secured second members 40x, 40y of magnetically controllable devices 24x, 24y.

Sensors 32x, 32y generate signals representative of the x and y movements through utilizing rack assemblies similar to that described in FIG. 8b where a moving component of sensor 32x, 32y is interconnected to the rack (e.g. 87s). Coils 48x, 48y are selectively energized to produce a magnetic flux in U-shaped first members 38x whose legs straddle the second member 40x, 40y. A magnetically controlled medium (not shown) is included between the respective legs and the second member 40x, 40y as shown in FIG. 4b and is preferably retained in an absorbent member as described therein. The control system 20 (FIG. 1) in response to position signals from leads 53x', 53y' controls the effective resistance generated by devices 24x, 24y by supplying signals to leads 53x, 53y.

Figure 9:
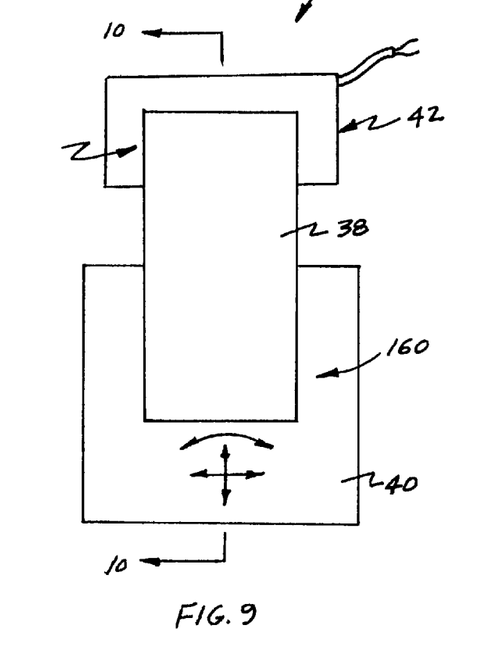
FIG. 9 is a side view of yet another embodiment of a magnetically-controllable device.
Figure 10:
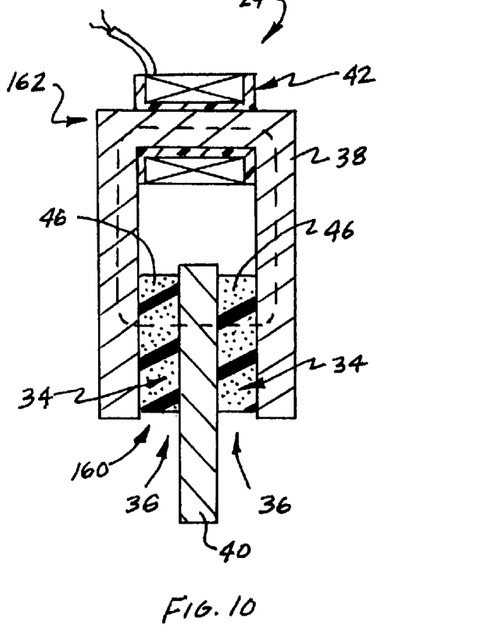
FIG. 10 is a cross-sectional view along line 10—10 of the device in FIG. 9.

Referring to FIGS. 9 and 10, another embodiment of a magnetically-controllable device 24 comprises a first member 38 having a unshaped body that receives second member 40 at its open end 160. An absorbent element 46 is disposed in each working space 36 between first member 38 and second member 40. Each absorbent element 46 contains magnetically-controllable medium 34. Magnetic-field generating device 42 is disposed about closed end 162 of second member 40, and creates a magnetic field through magnetically-controllable medium 34, as represented by flux lines 44, upon energization by computer system 28 (FIG. 1). Magnetic-field generating device 42 is connected to computer system 28 by wires 53. As indicated by the arrows on second member 40 (FIG. 9), the relative movement between the second member and first member 38 may be linear, rotational or curvilinear. Thus, this embodiment of magnetically-controllable device 24 provides resistance forces to oppose linear, rotational or curvilinear relative movements between first member 38 and second member 40.

The magnetically-controllable device 24 in FIGS. 9 and 10 may be integrated into haptic interface unit 55 (FIG. 3), by mounting the device to frame 94 and having disc 96 act as second member 40 much the same as is shown in FIG. 4b. In this case, disc 96 needs to comprise a magnetically soft material, as discussed above in reference to second member 40. Similarly, a pair of devices, like the magnetically-controllable device 24 in FIGS. 9 and 10, may be integrated into haptic interface unit 155 (FIGS. 5–7b). This may be accomplished in a joystick, for example, by mounting the devices to housing 146 and having first and second translating plates 124 and 126 act as a second member 40 in each device. Of course, plates would need to be manufactured from a magnetically permeable material.

Figure 11:
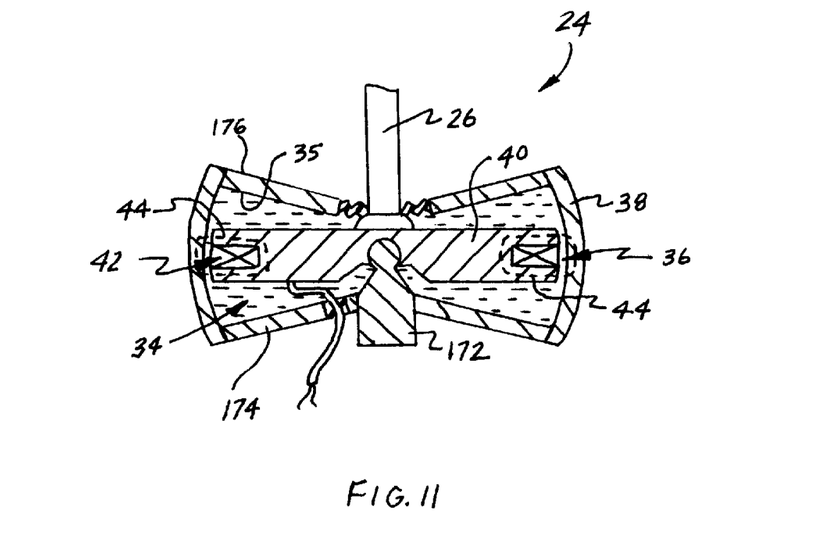
FIG. 11 is a cross-sectional view of another embodiment of a magnetically-controllable device.

Finally, referring to FIG. 11, another embodiment of magnetically-controllable device 24 comprises first member 38, having a curved, annular ring-shaped body, and second member 40 having a pivotable, disc-like body. Magnetic-field generating device 42 is an annular shaped member at the periphery of second member 40, adjacent to first member 38. Magnetically-controllable medium 34 is included in a chamber 35 and in the working space 36 between first member 38 and second member 40. Magnetic-field generating device 42 creates a magnetic field through magnetically-controllable medium 34 in working space 36, as represented by flux lines 44, upon energization by computer system 28 (not shown). Magnetic-field generating device 42 is connected to computer system 28 by wires 53.

An operator 22 (FIG. 1) in operable contact with haptic interface device 26, such as a joystick, moves second member 40 fixedly attached shaft haptic interface device 26. Pivot member 172 opposes device 26 on the other side of second member 40. Pivot member 172 preferably comprises a post having a ball-shaped end. Pivot member 172 is secured to magnetically-controllable device 24 by bottom plate 174, which also is fixedly attached to first member 38. Similarly, top member 176 may be connected to first member 38 to further reinforce magnetically-controllable device 24. Thus, as one skilled in the art will recognize, the teachings of the present invention may be implemented in a variety of haptic interface units to provide resistance forces to oppose the motion of haptic interface device 26 in haptic interface system 20. Moreover, it will be recognized that a wide variety of magnetically controllable devices may be utilized herein. For example, the magnetorheological fluid devices described in commonly assigned U.S. Pat. Nos. 5,816,372, 5,711,746, 5,652,704, 5,492,312, 5,284, 330 and 5,277,281 may be used.

Although the invention has been described with reference to these preferred embodiments, other embodiments can achieve the same results. Variations and modifications of the present invention will be apparent to one skilled in the art and the following claims are intended to cover all such modifications and equivalents.

What is claimed is:

1. A haptic interface system for providing resistance forces to a haptic interface device movable by an operator in at least one direction of displacement, the haptic interface system comprising:
   a controller for receiving a variable input signal and providing a variable output signal, said controller adapted for running an interactive program that processes said interactive program and said variable input signal and in response derives said variable output signal corresponding to a semi-active, variable resistance force; and
   a magnetically-controllable device that receives said variable output signal and provides said variable resistance force in proportion to said variable output signal, said magnetically controllable device comprising a volume of a magnetically controllable medium, the variable resistance forces being provided by changing the rheology of the magnetically controllable medium in response to said output signal to thereby directly control the ease of movement of the haptic interface device, said variable resistance forces being provided to resist displacement of the haptic interface device by the operator in at least one direction of displacement of said device.

2. The haptic interface system as recited in claim 1, the haptic device adapted to be in operable contact with said operator for controlling and responding to said interactive program, said haptic interface device in communication with said magnetically-controllable device and having a plurality of positions and directions of displacement, wherein an ease of movement of said haptic interface device among said plurality of positions is controlled by said variable resistance force.

3. The haptic interface system as recited in claim 2, further comprising a sensor for identifying a detected position within said plurality of positions of said haptic interface device, said sensor providing said variable input signal based on said detected position.

4. The haptic interface system as recited in claim 3, wherein said magnetically-controllable device comprises:
   a magnetic-field generating device energizable by said variable output signal to provide a variable strength magnetic field;
   a first member adjacent to said magnetic field generating device;
   a second member adjacent to said magnetic field generating device and connected to said haptic interface device; and
   wherein said magnetically-controllable medium is located between said first member and said second member.

5. The haptic interface system as recited in claim 4, further comprising an absorbent element disposed between said first member and said second member, said absorbent element containing said magnetically-controllable medium.

6. The haptic interface system as recited in claim 5, wherein said absorbent element is compressed by a compression amount from a resting state.

7. The haptic interface system as recited in claim 6, wherein said compression amount is in the range of about 30% to 70% of said resting state.

8. The haptic interface system as recited in claim 5, wherein said absorbent element is an open-celled foam.

9. The haptic interface system as recited in claim 8, wherein said absorbent element is a polyurethane material.

10. The haptic interface system as recited in claim 4, wherein said magnetically controllable medium is a magnetorheological fluid.

11. The haptic interface system as recited in claim 10, wherein said magnetic-field generating device is a coil.

12. The haptic interface system as recited in claim 11, wherein said coil comprises a wire having a number of turns and a gauge, wherein said number of turns and said gauge are dependent upon a desired range of said variable strength magnetic field.

13. The haptic interface system as recited in claim 12, wherein said output signal comprises a voltage and a current, and wherein said number of turns and said gauge are dependent upon a desired range of said voltage and said current, and wherein said voltage and said current are dependent upon a desired range of said variable strength magnetic field.

14. The haptic interface system as recited in claim 4, wherein said variable resistance force is transferred to said haptic interface device through said second member.

15. The haptic interface system as recited in claim 14, wherein said second member is adapted for movement relative to said first member.

16. The haptic interface system as recited in claim 15, wherein said second member is adapted for linear movement relative to said first member.

17. The haptic interface system as recited in claim 15, wherein said second member is adapted for at least partial rotational movement relative to said first member.

18. The haptic interface system as recited in claim 15, wherein said second member is adapted for curvilinear movement relative to said first member.

19. The haptic interface system as recited in claim 15, wherein said haptic interface device comprises a steering device.

20. The haptic interface system as recited in claim 19, wherein said haptic interface device comprises a joystick.

21. The haptic interface system as recited in claim 19, wherein said haptic interface device comprises a steering wheel.

22. The haptic interface system as recited in claim 1, wherein said interactive program is a video game.

23. The haptic interface system as recited in claim 3, wherein said controller further comprises a host computer that runs said interactive program.

24. The haptic interface system as recited in claim 23, wherein said controller further comprises a control unit modifying said variable input signal received from said sensor and providing a modified variable input signal to said host computer, said control unit further modifying said variable output signal and providing a modified variable output signal to said magnetically-controllable device.

25. The haptic interface system as recited in claim 24, further comprising an amplifier device in communication with said control unit and said magnetically-controllable device, said amplifier device receiving said modified variable output signal and providing an amplified variable output signal to said magnetically-controllable device.

26. The haptic interface system as recited in claim 1, further comprising a video display for displaying images resulting from the processing of said interactive program by said controller.

27. A haptic interface unit for providing resistance forces to a haptic interface device movable by an operator in at least one direction of displacement, the haptic interface unit comprising:

a magnetically-controllable device adapted to provide a variable resistance force in proportion to a received variable output signal generated by a controller processing an interactive program, said variable resistance forces being provided to resist travel of the haptic interface device by the operator in at least one direction of displacement of said device, said magnetically controlled device comprising a magnetically controllable medium, the variable resistance forces being provided by changing the rheology of the magnetically controllable medium in response to said output signal to thereby directly control the ease of movement of the haptic interface device.

28. Interface unit as recited in claim 27, wherein said magnetically-controllable device further comprises:

a magnetic-field generating device energizable by said variable output signal to provide a variable strength magnetic field;

a first member adjacent to said magnetic field generating device;

a second member adjacent to said magnetic field generating device; and wherein the magnetically-controllable medium is located between said first member and said second member.

29. The haptic interface unit as recited in claim 28, wherein the haptic interface device is adapted to be in operable contact with said operator for controlling and responding to said interactive program, said haptic interface device in communication with said magnetically-controllable device and having a plurality of positions.

30. The haptic interface unit as recited in claim 29, further comprising a control unit that provides a signal to said magnetically-controllable device to control said variable resistance force.

\* \* \* \* \*